United States Patent
Neybert et al.

(10) Patent No.: US 10,715,988 B2
(45) Date of Patent: Jul. 14, 2020

(54) DISASTER EVENT MANAGMENT

(71) Applicant: AT&T Intellectual Property I, L.P., Atlanta, GA (US)

(72) Inventors: Karl Neybert, Overland Park, KS (US); Stephen Deshaies, Snoqualmie, WA (US); Barry Husby, Lawrenceville, GA (US); Daniel Steven, Troy, IL (US); Martha Happ, Reno, NV (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/502,600

(22) Filed: Jul. 3, 2019

(65) Prior Publication Data
US 2019/0327599 A1    Oct. 24, 2019

Related U.S. Application Data

(63) Continuation of application No. 15/698,785, filed on Sep. 8, 2017, now Pat. No. 10,375,555.

(51) Int. Cl.
*H04W 4/90* (2018.01)
*H04W 4/02* (2018.01)
(Continued)

(52) U.S. Cl.
CPC ............ *H04W 4/90* (2018.02); *G06Q 50/265* (2013.01); *H04W 4/02* (2013.01); *H04W 4/21* (2018.02);
(Continued)

(58) Field of Classification Search
CPC .......... H04W 4/90; H04W 4/21; H04W 4/02; H04W 4/14; H04W 4/20; G06Q 50/265;
(Continued)

(56) References Cited

U.S. PATENT DOCUMENTS 5,560,852 A    10/1996 Mura
5,793,882 A     8/1998 Piatek et al.
(Continued)

FOREIGN PATENT DOCUMENTS

CN          106559476 A    4/2017
KR    10-2010-0101877 A    9/2010

OTHER PUBLICATIONS

Non-Final Office Action received for U.S. Appl. No. 15/698,785 dated Jun. 21, 2018, 32 pages.
(Continued)

*Primary Examiner* — Mong-Thuy T Tran
(74) *Attorney, Agent, or Firm* — Amin, Turocy & Watson, LLP

(57) ABSTRACT

Various embodiments disclosed herein provide for a disaster event management system that can track location of employees and other affected during disaster events and other emergency situations and determine their safety status. The disaster event management system can determine when an emergency event has occurred, and determine which employees are likely to be affected by the emergency, based on their location at the time and other directory information. The system can provide an interface on user equipment devices operated by the employees (mobile devices, laptops, computers, tablets, etc) to provide their status along with an identification code to verify their identification. In an embodiment, the system can prompt the user equipment devices to provide a status in response to determining that the employee may be affected by the emergency situation.

20 Claims, 10 Drawing Sheets

(51) Int. Cl.
*G06Q 50/26* (2012.01)
*H04W 4/21* (2018.01)
*H04W 4/20* (2018.01)
*H04W 4/14* (2009.01)

(52) U.S. Cl.
CPC .... *H04M 2242/04* (2013.01); *H04M 2242/28* (2013.01); *H04M 2242/30* (2013.01); *H04W 4/14* (2013.01); *H04W 4/20* (2013.01)

(58) Field of Classification Search
CPC ......... H04M 2242/04; H04M 2242/28; H04M 2242/30
USPC ........................................................ 455/466
See application file for complete search history.

(56) References Cited

U.S. PATENT DOCUMENTS

| | | | |
|---|---|---|---|
| 6,956,474 B2 | 10/2005 | Jakubowski | |
| 7,468,658 B2 | 12/2008 | Bouressa | |
| 7,605,696 B2 | 10/2009 | Quatro | |
| 8,903,424 B2 | 12/2014 | Proietti et al. | |
| 9,116,230 B2 | 8/2015 | Vartanian et al. | |
| 9,848,313 B1 | 12/2017 | Cottle et al. | |
| 9,947,199 B2 | 4/2018 | Mittal et al. | |
| 10,022,086 B1* | 7/2018 | Kahn | A61B 5/6887 |
| 10,251,128 B2* | 4/2019 | Nguyen | H04W 52/0229 |
| 10,504,124 B2* | 12/2019 | Schultz | G06Q 30/02 |
| 2005/0220277 A1* | 10/2005 | Blalock | G06Q 10/10 379/45 |
| 2009/0077045 A1* | 3/2009 | Kirchmeier | G06Q 10/06 |
| 2013/0218959 A1* | 8/2013 | Sa | G08B 27/005 709/204 |
| 2014/0230030 A1 | 8/2014 | Abhyanker | |
| 2015/0195676 A1* | 7/2015 | Endress | H04L 67/306 455/404.2 |
| 2015/0317809 A1 | 11/2015 | Chellappan et al. | |
| 2015/0358794 A1 | 12/2015 | Nokhoudian et al. | |
| 2015/0364017 A1 | 12/2015 | Hall et al. | |
| 2016/0005293 A1 | 1/2016 | Yoo et al. | |
| 2016/0044625 A1 | 2/2016 | Anesi et al. | |
| 2016/0050037 A1 | 2/2016 | Webb | |
| 2016/0371966 A1 | 12/2016 | P | |
| 2017/0191843 A1 | 7/2017 | Yadav | |
| 2017/0195833 A1 | 7/2017 | Chami et al. | |
| 2017/0230786 A1 | 8/2017 | Ramamurthy et al. | |
| 2017/0251347 A1 | 8/2017 | Mehta et al. | |
| 2018/0098206 A1 | 4/2018 | Nguyen | |
| 2018/0176362 A1 | 6/2018 | Cohen | |
| 2018/0189913 A1* | 7/2018 | Knopp | G06Q 50/265 |

OTHER PUBLICATIONS

Final Office Action received for U.S. Appl. No. 15/698,785 dated Nov. 28, 2018, 38 pages.

U.S. Appl. No. 62/402,258, Kurt Nguyen, filed Sep. 30, 2016, Qnexis,Inc (22 pages) (see Pub# US 2018/0098206).

Notice of Allowance received for U.S. Appl. No. 15/698,785 dated Mar. 26, 2019, 18 pages.

* cited by examiner

DISASTER EVENT MANAGMENT

RELATED APPLICATION

The subject patent application is a continuation of, and claims priority to, U.S. patent application Ser. No. 15/698,785, filed Sep. 8, 2017, and entitled "DISASTER EVENT MANAGEMENT," the entirety of which application is hereby incorporated by reference herein.

TECHNICAL FIELD

The present application relates generally to a field of mobile communication and, more specifically to accounting for people and connected devices during a disaster or other emergency situation.

BACKGROUND

When disaster strikes and other emergency events occur, keeping track of people and determining who is safe is important, not just for public safety authorities, but for employers as well. Knowledge of where employees are, other connected devices (e.g., internet of things "IOT" devices) and sensors and their statuses can be used to inform family members and authorities, but also can be used to determine best practices for future events.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
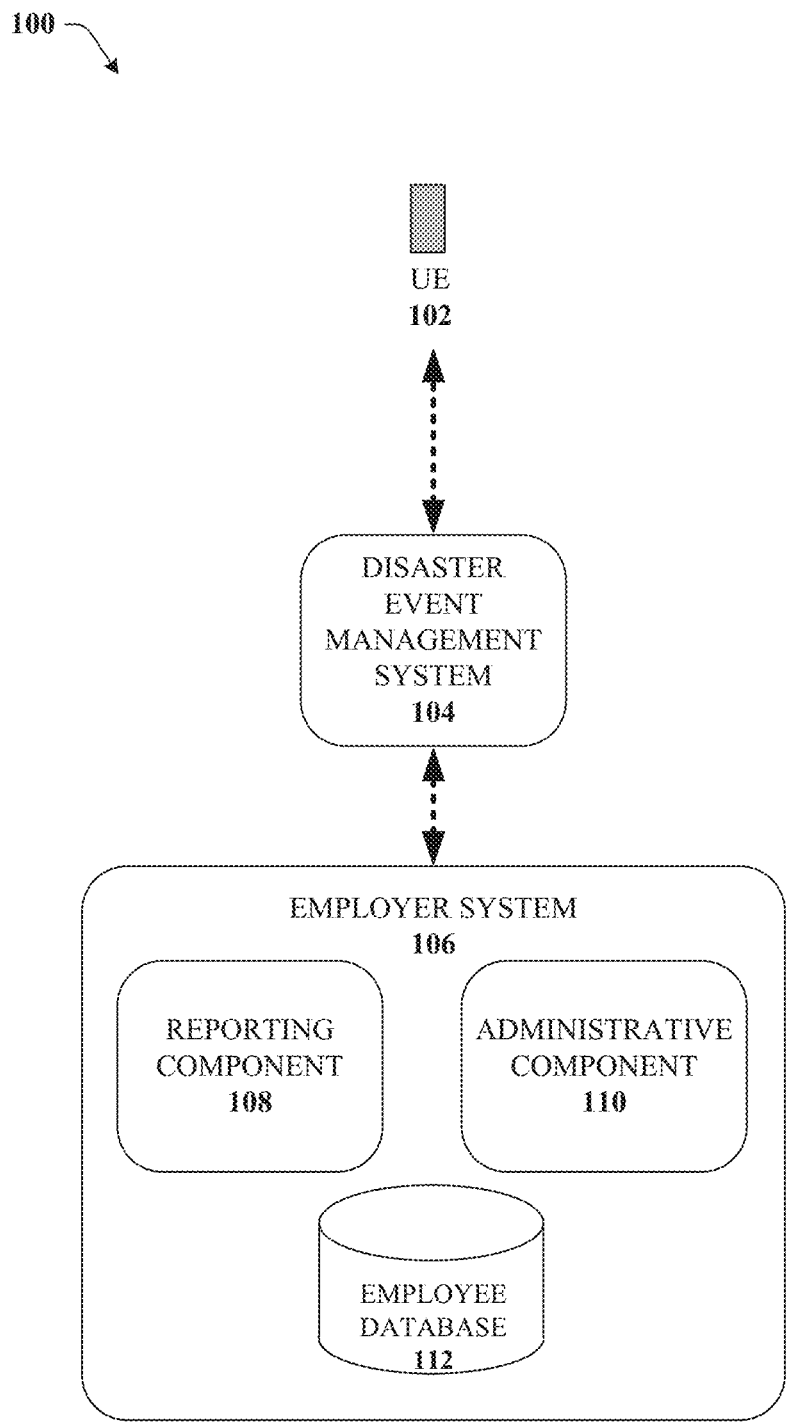
FIG. 1 illustrates an example disaster event management system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for a disaster event management system that can track locations of employees and others affected during disaster events and other emergency situations and determine their safety status. The disaster event management system can determine when an emergency event has occurred, and determine which employees are likely to be affected by the emergency, based on their location at the time and other directory information. The system can provide an interface on user equipment devices operated by the employees (mobile devices, laptops, computers, tablets, etc) to provide their status along with an identification code to verify their identities. In an embodiment, the system can prompt the user equipment devices to provide a status in response to determining that the employee may be affected by the emergency situation.

The disaster event management system can enable employers and other agencies to rapidly account for thousands of employees following a disaster or other emergency event. This can be particular useful when worksites (e.g., office buildings) and other facilities have to be evacuated, making it harder for supervisors to track their employees to ensure their safety. The integrated disaster event solution can also enable enterprise customers to target critical information pushes, preparedness exercises and best practices, as well as generate reports on evacuation and safety metrics and data visualization. The disaster event management system can also enable people afflicted by the emergency to rapidly distribute information and provide for employee to employee resource sharing.

Similarly, note that for simplicity we use the radio network node or simply network node is used for gNB. It refers to any type of network node that serves UE and/or connected to other network node or network element or any radio node from where UE receives signal. Examples of radio network nodes are Node B, base station (BS), multi-standard radio (MSR) node such as MSR BS, gNB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Likewise, for reception we use the term user equipment (UE). It refers to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports are also interchangeably used but carry the same meaning in this disclosure.

In various embodiments, a system can comprise a processor and a memory that stores executable instructions that, when executed by the processor facilitate performance of operations. The operations can comprise determining that an event that satisfies a criterion related to public safety has occurred. The operations can also include determining that a user equipment associated with a user account is at a location associated with the event. The operations can also comprise sending a status update request to the user equipment. The operations can also comprise, in response to receiving status update feedback from the user equipment, updating a safety status of the user account, the safety status of the user account relating to a safety of a person associated with the user account.

In another embodiment, method comprises receiving, by device comprising a processor, a notification that an emergency event has occurred within a first defined distance from a worksite. The method can also comprise determining, by the device, that a user equipment associated with an employee is within a second defined distance from the worksite. The method can also comprise receiving, by the device, a status update from the user equipment, wherein the status update comprises a validation code. The method can also comprise determining, by the device, whether the validation code is a match with directory information associated with the user equipment. The method can also comprise in response to the receiving the status update and the validation code being determined to be the match with the directory information, updating, by the device, a status associated with the employee.

In another embodiment machine-readable storage medium, comprising executable instructions that, when executed by a processor of a device, facilitate performance of operations. The operations can comprise determining that a mobile device associated with an employee is within a predetermined distance of an emergency event based on a network location of the mobile device. The operations can also comprise receiving a status update from the mobile device, wherein the status update comprises a validation code and status information. The operations can also comprise matching the validation code to directory information associated with the mobile device. The operations can also comprise in response to the matching the validation code to the directory information, updating a status of the employee in an emergency tracking database with the status information.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. The mechanical parts can include sensors on a float, tilt monitors, and etc. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), machine to machine, satellite, microwave, laser, Z-Wave, Zigbee and other 802.XX wireless technologies and/or legacy telecommunication technologies.

FIG. 1 illustrates an example embodiment 100 of a disaster event management system 104 in accordance with various aspects and embodiments of the subject disclosure. In one or more embodiments, disaster event management system 104 can track a location of a UE 102 and if it is determined the UE 102 is within a predetermined range of a disaster event, or other emergency situation (e.g., weather related, earthquake, volcano, act of terror, war, etc.) and if so, update a status of the employee associated with the UE 102 in response to receiving feedback from the UE 102. The UE 102 can be a mobile device such as a cellular phone, a smartphone, a tablet computer, a wearable device, a virtual reality (VR) device, a heads-up display (HUD) device, a smart car, a machine-type communication (MTC) device, and the like. User equipment UE 102 can also comprise IOT devices that communicate wirelessly.

In an embodiment, the UE 102 can be associated with an employee account. For example, the UE 102 can be a device issued by an employer, or is otherwise registered with the employer. In other embodiments, the UE 102 can be a personal device, not otherwise associated with the employer, but still used by an employee associated with the employer system 106.

The disaster event management system 104 can determine when an emergency situation has occurred (e.g., from public safety organizations, alerts, social media data, etc.) and determine whether UE 102 is in a location that may be affected by the emergency situation. In an embodiment, the disaster event management system 104 can determine from an employee database 112 in the employer system 106 whether an employee is assigned to a worksite (e.g., facility, office building, region, etc) that is affected by the emergency situation. In an embodiment, the disaster event management system 104 can also determine locations of customers, vendors, visitors, and others that may be in area affected by the emergency. As an example, a property manager or owner could use the system to get input from people in their apartments, hotels, malls, multi-tenant office buildings, RV parks, hospitals, education institutions, city buildings, and etc.

In other embodiments, the disaster event management system 104 can determine the location of the UE 102 from GPS data on the UE 102 or based on which network node the UE 102 is attached. In an embodiment, the disaster event management system 104 can determine a location of the UE 102 from a last known GPS coordinate location. This can be helpful when a device has been turned off, or is in a building. In other embodiments, the disaster event management system 104 can determine a location of the UE 102 from an internet protocol (IP) address associated with a data transmission from the UE 102 if the UE 102 is connected to a WiFi signal or is otherwise connected to a local area network or wide area network with a known location. In other embodiments, the disaster event management system 104 can determine a location of the UE 102 by utilizing calendar data, e.g., if the employee user account has calendar data indicating a meeting or travel plans at or to a location affected by the emergency situation. In yet another embodiment, the disaster event management system 104 can integrate with an employer access management system and determine who is present in a building to be evacuated based on the employees that swiped badges to enter the building. The administrative component 110 can provide access to lists of employees present in a building at the time of the emergency, and disaster event management system 104 can solicit status updates from UEs associated with the employees present.

Data on visitors can be collected from multiple sources such as building/location access (not just employer access) management systems and detection systems that can recognize mobile devices such as smart phones. For example, if a person is in a building with their cell phone on (not airplane mode) then some information like phone numbers or SIM ID can be captured and used to augment building occupant counts, and last known location (especially if multiple sensors throughout a location is used). Information on employees and contractors can come from human resource system, directory database, etc. and even data from corporate travel indicating an employee from one location will be in the geographic region impacted by an emergency situation.

Once the disaster event management system 104 determines that the UE 102 is present, the disaster event management system 104 can send a prompt to the UE 102 to provide an updated status. In an embodiment, the prompt can be sent via short message service (SMS) message to the UE 102, or by voice call, or by a notification in an application on the UE 102. The employee can enter a status (or use a predefined status: "Safe", "Okay", and etc.), and the disaster event management system 104 can receive the status update, and return the status update to the employer system. In an embodiment, the user can send back the status to the disaster event management system 104 without having received a prompt. For instance, the user can send an SMS to a predefined number, or call a number and use the phone system's dual tone multi-frequency (DTMF) signaling to send status updates. In other embodiments, the user can send a status update to the disaster event management system 104 via an app without having been prompted.

In an embodiment, the status update can include a verification code identifying the employee. The verification code can be an employee identification code or other code issued by the employer that may identify the employee, and/or the business group to which the employee belongs. The disaster event management system 104 can match the verification code provided in the status update to a verification code associated with the employee in the employee database 112 before updating the status of the employee.

In an embodiment, the status update can include one or more short message codes that can inform a diverse group of carriers where to send the status update and provide insight into which company a person sending the message works for. Companies could also share a 5 digit short message code, but then would need to have an application or user input to provide a unique customer code and employee identification code. In an embodiment, the unique customer (company) and employee (worker) codes enable message validation (weeding out spam) and correlation to individuals regardless of the device used to send in the message. For example, an employee could use a company provided or a personal mobile phone to text the designated number, as long as they identified their unique ID. That is especially important during disasters where the person may not have ready access to mobile phone listed in their contact information.

In an embodiment, the verification code may not be necessary if the employee is providing the status update via a device that is already registered with the employer system 106. For instance, if the phone number of a received SMS message providing a status report matches the phone number of an employee, the disaster event management system 104 can update the status of the employee. Likewise, the UE 102 may be a device not registered with the employer system 106, with no records associated with the UE 102 in the employee database 112, such as if the phone were a personal device, or a pay-phone, or other device. The verification code can be used to authenticate the employee status update in such a case.

In an embodiment where the verification code is not provided, and/or the device is not registered, or when the verification code does not match the code in the employee database 112, the disaster event management system 104 can resend a request for update or request the user to re-enter the verification code.

Rules would be set up in GSMS to validate if incoming mobile-originated messages contain an employee's unique identifier or not. Response messages would indicate if a valid employee identifier was found in the incoming message such as a text string that matches the company employee ID schema (e.g., two letters followed by four numbers) before the disaster event management system 104 forwards to the reporting component 108, else the disaster event management system 104 would reply back with a negative response notice informing the sender to try again with a valid ID.

An administrative component 110 on the employer system 106 can track the responses and reporting component 108 can be used to generate reports for supervisors and public safety officials to determine the status of employees and others affected by the emergency. The administrative component 110 can track data associated with how employees are reporting back via the disaster event management system 104 and the information can be used to identify best practices and improved response protocols.

An administrative component 110 on the employer system 106 can track the responses and reporting component 108 can be used to generate reports for supervisors and public safety officials to determine the status of employees and others affected by the emergency. The administrative component 108 can track data associated with how employees are reporting back via the disaster event management system 104 and the information can be used to identify best practices and improved response protocols.

In an embodiment, the disaster event management system 104 can facilitate two way communications to and from the UE 102. The disaster event management system 104 can be used to broadcast a message to all UEs belonging to employees affected by an emergency situation. For example, the administrative component 110 can be configured to transmit, via the disaster event management system 104 a message or set of messages to a single UE (e.g., UE 102) or group of UEs (e.g., all UEs associated with employees at a worksite, or in a business group). The message(s) can contain emergency instructions to both the people who have responded with status updates and/or to people who are currently unaccounted for. The messages can be different depending on whether the status update has been provided by the person or whether they are unaccounted for. The messages can be sent via SMS message, voice call, email, or via notifications in an application on the UEs. During a disaster event, if SMS messaging is not available or is limited in its availability, IP messaging may provide an alternate method to account for employees. The disaster event management system 104 can support 2-way SMS messaging, with IP message failover to help ensure that employees have a robust, multi-modal messaging option to account for themselves following a disaster in their area. IP messaging may require an application to be loaded and active on the employee's mobile device.

In an embodiment, two way communication can be established with a person checking in. For instance, if UE 102 checked in and provided their status to disaster event management system 104, they could be accounted for and transferred to an emergency responder system like 911 if needed. Assets that are responding to inquiries or sending self-initiated notices, such as an emergency deliberator being activated, could include chips to report in and also enable responders to talk with people near the device. The same could be done for emergency exits and fire extinguishers.

In an embodiment, the administrative component 110 can store copies of the messages for automated accounting of employees following the emergency situation. The disaster event management system 104 can use standard and flexible APIs that feed real-time data into their reporting systems. This can enable the employer system 106 to quickly determine the accounted for status of their employees following a disaster and create reports as needed via the reporting component 108. In an embodiment, the messages can be stored for at least 90 days.

In an embodiment, the administrative component 110 can use a secure web enabled portal for company administrators that supports basic messaging, contact information maintenance (i.e. uploads of target phone number lists), and reporting or data download into a spreadsheet. This is particularly important for organizations without their own reporting system that can leverage an API automated input feed.

In an embodiment, each message can be tracked, searchable, downloadable, and can include both the message text and metadata device's automatic number identification (ANI—i.e. caller ID), date/time stamp, and message type (SMS or IP). In an embodiment, messages can continue to be sent to the UEs affected by the emergency situation at periodic intervals until a validated response is received.

Note: Customer reporting tools or potential future cloud based reporting solution could include a function to cross-reference mobile number with employee contact information, but that is not native in the GSMS messaging solution.

Figure 2:
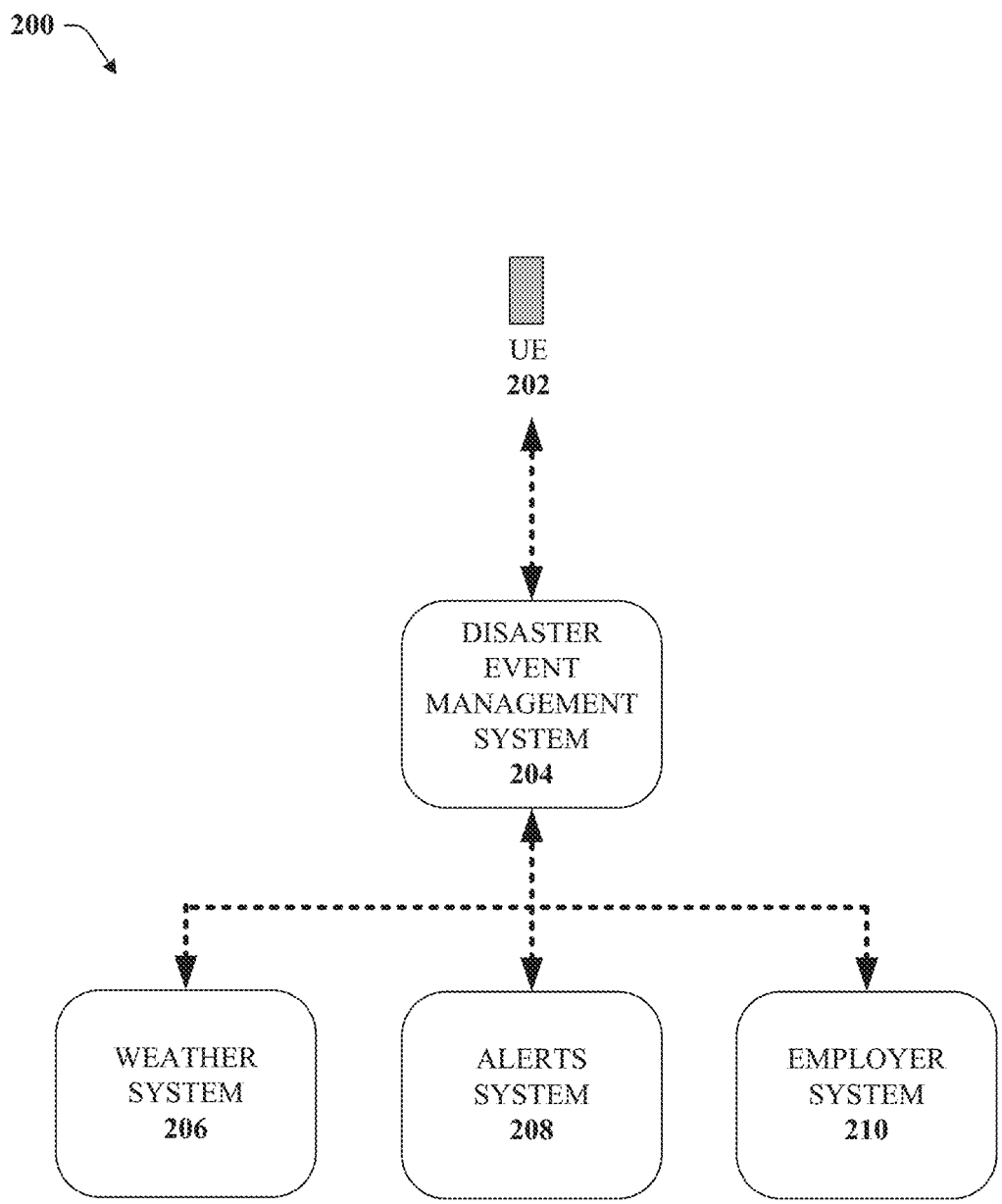
FIG. 2 illustrates an example disaster event management system in accordance with various aspects and embodiments of the subject disclosure.

Turning now to FIG. 2, illustrated is an embodiment 200 showing an example disaster event management system 204 in accordance with various aspects and embodiments of the subject disclosure.

In an embodiment, the disaster event management system 204 can receive status updates from UE 202 in response to there being an emergency situation that may affect an employee or person associated with the UE 202. The disaster event management system 204 can solicit status updates from UE 202 or can otherwise receive and update the statuses with employer system 210 when the disaster event management system 204 determines that an event has occurred that warrants the response.

Disaster event management system 204 can determine that an event is serious enough based on several different sources of information. A weather system 206 can provide weather updates and notifications to the disaster event management system 204 and if a weather update is serious enough (e.g., tsunami, tornado warning, or actual reports of a tornado touching down near an office building worksite, etc.) then the disaster event management system 204 can send a prompt for status updates to the UE 202. The weather system 206 can be sourced by active advisory statements from the National Weather Service or other governmental and private agencies that provide weather alerts. In an embodiment, disaster event management system 204 can relay status updates and other contextual information received from the UE 202 back to the weather system 206. In this way, forecasts, and other advisory statements can include contextual information from the scene that may be useful to others.

In an embodiment, the disaster event management system 204 can determine an emergency has occurred in response to a plurality of tracked devices that are no longer reporting status information. For example, if multiple IoT or connected devices or sensors stop reporting, to the disaster event management system 204, then the disaster event management system 204 could determine that an emergency has occurred. Building alarms and environmental sensors could be correlated to trigger an alert via alerts system 208 to a monitoring station or individuals who would then determine if a notification would go out to individuals in a given building or location. Multiple no power indicators or emergency generators starting can help indicate the geographic scope of an emergency. Automated asset accounting can also include IoT devices reporting if an asset is moving and has its emergency lights on, which indicates its status to mapping coronation tools that can help especially if 911 dispatch is experiencing heavy volumes. First responders could initiate a request to see if any assets are near them to provide backup. On the people side, knowing someone's phone is moving or outside a building can also be helpful An alerts system 208 can also provide information relating to emergency situation. An alerts system 208 can be provided with information from first responders systems (e.g., police, fire service, National Guard, Homeland Security and etc). If an emergency situation is declared by any organization, the alert can be forwarded to disaster event management system 204 which can start soliciting updates from UEs associated with employees that may be affected by the emergency. Similarly, the alerts system 208 can also be provided with contextual data about the scene of the emergency from the disaster event management system 204. The information can help first responders determine how best to respond to the emergency situation. For example, if there is an emergency, and the disaster event management system 204 can track the locations of the UEs that have responded to the status updates, and also track locations of UEs that have not responded, or can determine areas where there have been no responses from, that location data can be passed to the first responders via the alerts system 208 to inform the first responders about where there might be areas of greater danger. As an example, if an office building has been evacuated due to a fire, the disaster event management system 204 can determine which business groups or employees associated with floors or offices have and have not responded. The disaster event management system 204 can determine that a group of people may be trapped in a location or otherwise have not been able to respond and based on the employee directory information or the location data, can indicate where the first responders should search via the alerts system 208. The directory information can include information including employee personnel data, contact information, employee identification number and job description data. The directory information can also include information about job hierarchy (supervisors, direct reports, etc), and job location (e.g., where is the employee assigned, which office building, office number, etc). The directory information can be stored in a database managed by a human resource department, or in a lightweight directory access protocol directory which is an open, vendor neutral application protocol for accessing and maintaining distributed directory information services over an IP network.

In an embodiment, notifications to evacuate, or notifications about emergencies can be propagated by internal company mechanisms via the employer system 210.

Figure 3:
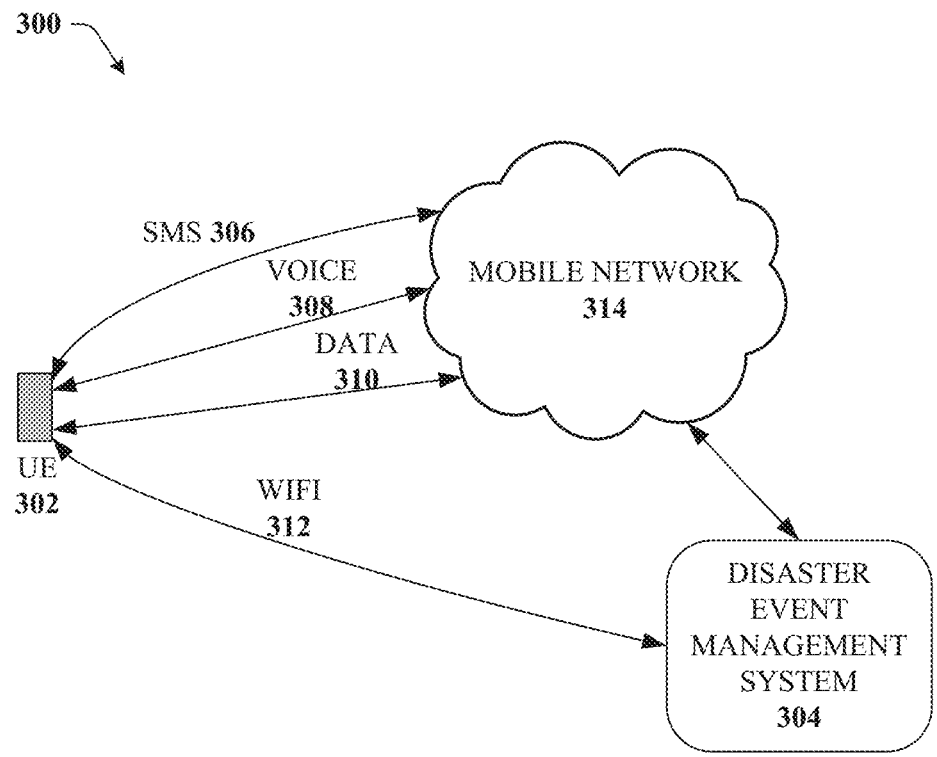
FIG. 3 illustrates exemplary communication pathways for a disaster event management system accordance with various aspects and embodiments of the subject disclosure.

Turning now to FIG. 3, illustrated in embodiment 300 are exemplary communication pathways for a disaster event management system 304 in accordance with various aspects and embodiments of the subject disclosure.

In an embodiment, the disaster event management system 304 can be communicably coupled to a UE 302 via a variety of means, including via a mobile network 314 that uses a radio access network to communicate with the UE 302 via SMS messages 306, voice calls 308, and/or IP data 310. The disaster event management system 304 can also transmit and receive IP data to and from the UE 302 via a WiFi network 312 or other access network not related to the mobile network 314.

In an embodiment, the disaster event management system 304 can have a preferred mechanism of communication (e.g., IP data via an application on the UE 302) and then switch to another form if preferred means is unavailable. In an embodiment, the communication preferences can be set by the employer system. In other embodiments, the mobile network can set the preference order based on network conditions. In still other embodiments, the disaster event management system 304 can set the preference based on the type of disaster or emergency situation.

In an embodiment, the disaster event management system 304 can facilitate 2 way communications with the UE 302, allowing voice calls, data transfers (audio, images, video, etc) to and from the UE 302. In an embodiment, the disaster event management system 304 can facilitate communications to and from other UEs and UE 302. In an embodiment, the disaster event management system 304 can facilitate asymmetric communications (e.g., broadband in one direction, and SMS in another) depending on the network conditions, emergency situation, and other contextual information (employer preferences, and etc.).

Figure 4:
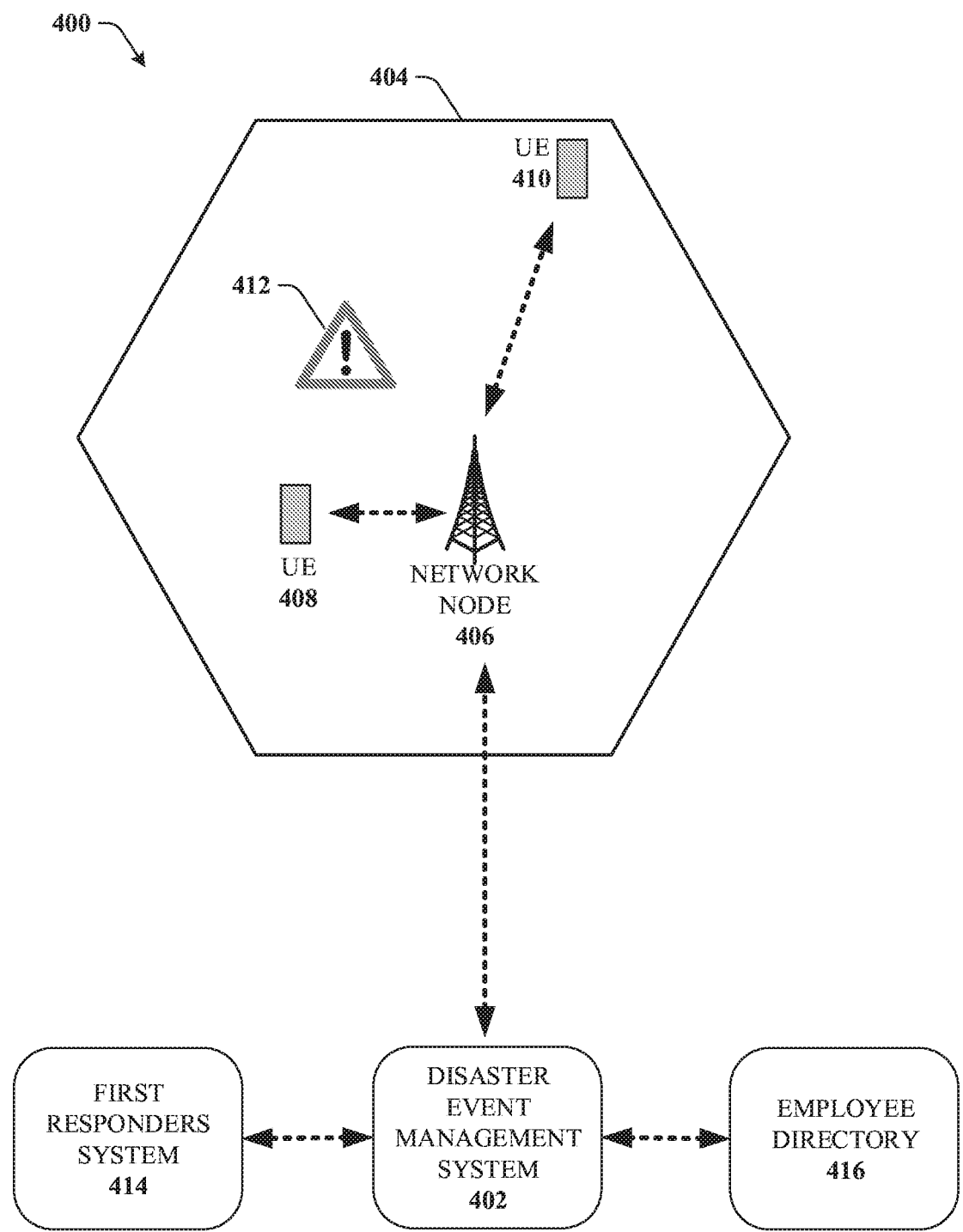
FIG. 4 illustrates an example disaster event management system and cell site or worksite in accordance with various aspects and embodiments of the subject disclosure.

Turning now to FIG. 4, illustrated is an embodiment 400 of an example disaster event management system 402 and cell site or worksite 404 in accordance with various aspects and embodiments of the subject disclosure.

In one or more embodiments, disaster event management system 402 can determine that an emergency 412 has occurred in a region 404. Region 404 can be an office building, town, city, region, or cell site serviced by network node 406. In response to determining that an emergency has occurred, the disaster event management system 402 can track the locations of UEs 408 and 410 and determine that they are with the area 404 that might be affected by emergency 412. The disaster event management system 402 can send a status request to one or more of UE 408 or 410, and update their status with an employer system in response to receiving feedback from the UE 408 and 410. In an embodiment, the disaster event management system 402 may receive the status update without having sent the status request.

The disaster event management system 402 can track the location of UE 408 and 410 and if it is determined the UEs are within a region 404, update a status of the employee associated with the UE 102 in response to receiving feedback from the UE 102. The disaster event management system 402 can determine the location of the UE 408 and 410 based on GPC data received from the UE 408 and 410 or from network node 406 which can indicate to disaster event management system 402 that the UE 408 and 410 are attached to the network node 406. In an embodiment, the disaster event management system 402 can determine the location of the UEs from the network node 406 and other network nodes which can perform multilateration in order to determine the location of the mobile devices.

The disaster event management system 402 can determine when an emergency situation has occurred (e.g., from public safety organizations, alerts, social media data, etc.) based on alerts from the first responders system 414. In an embodiment, the disaster event management system 104 can determine from an employee directory 416 whether an employee is assigned to a worksite (e.g., facility, office building, region, etc) that is affected by the emergency 412.

In an embodiment, the disaster event management system 402 can start to receive status reports from UE 408 and/or UE 410 even before the disaster event management system 402 determines that an emergency 412 has occurred. This information can indicate that there is some type of emergency, and other information provided with the status updates can indicate the nature of the emergency 412 (e.g., what type of emergency it is, where it is, when it happened, etc). This information can be passed to a first responders system 414 (e.g., 911 service) which can alert the authorities to the emergency 412. The information can also be passed to other monitoring and/or reporting persons or systems. Images, audio, video, and other contextual information received from the UEs 408 and 410 can also be passed to the first responders system as well as to other UEs in the area to alert them about the emergency 412.

In an embodiment, the disaster event management system 402 can send specialized alerts to UEs depending on their location in area 404 as well as their jobs and roles (as defined by employee directory 416).

In an embodiment, the disaster event management system 402 can send specialized alerts to UEs depending on their location in area 404 as well as their jobs and roles (as defined by employee directory 414). For instance, if an employee account associated with UE 408 has a job as a lineman, a weather report indicating potential lightning can trigger the emergency response by the disaster event management system 402 for UE 408, when it may not trigger it for a user account associated with UE 410. The disaster event management system 402 can also ensure that mobile workers location is known and send a check-in request at certain time intervals or if moving outside a geo-fence of where they were scheduled to go.

Deviations from planned routes can also trigger a status request from the disaster event management system 402. If a company vehicle left a certain area or the real estate person left the region where they were going to show homes, then an automated alert could be sent by disaster event management system 402 to the affected UE.

In an embodiment, the disaster event management system 402 can activate a mobile device camera or microphone (e.g., for an employer issued UE) if the UE has not responded to the status requests. Information could be captured and recorded for use by the first responders system 414 such as police, but privacy safeguards can be used to ensure inadvertent recording did not occur. Automated sensors on video or still images could detect if large amounts of skin were showing without a related violent act. The disaster event management system 402 could incorporate AI image processing; machine learning and big unstructured data filtering in order to make inferences about the safety and status of employees. The disaster event management system 402 could also automatically contact supervisors if there have been no check-ins by the employee.

In an embodiment, UE 408 can send a push status update (e.g., initiated by the employee associated with 408) in response to local conditions. For instance, the employee may be walking to their car, and feel threatened by somebody following them. The alert can be passed from the disaster event management system 402 to the first responders system 414, and a service can be offered to escort the employee associated with UE 408 to their car or building.

In an embodiment, the disaster event management system 402 can facilitate informing others when a person has responded with their status or has not responded. Each employee can have a list of numbers or email addresses to notify in case of emergency. When the disaster event management system 402 receives a status report from the UE, the disaster event management system 402 can notify each of the numbers or email addresses via SMS, voice call, email, etc, that the employee associated with the UE is ok. The disaster event management system 402 can extract the information about the contacts to notify from the employee directory 416 (e.g., a LDAP directory).

In an embodiment, the disaster event management system 402 can facilitate informing others when a person has responded with their status or has not responded. Each employee can have a list of numbers or email addresses to notify in case of emergency. When the disaster event management system 402 receives a status report from the UE, the disaster event management system 402 can notify each of the numbers or email addresses via SMS, voice call, email, etc, that the employee associated with the UE is ok.

The disaster event management system 402 can extract the information about the contacts to notify from the employee directory 414 (e.g., a LDAP directory).

In an embodiment, disaster event management system 402 can also update the employee status for status updates received within a predetermined time period after the emergency 412 has been determined to start.

In an embodiment, the disaster event management system 402 can also integrate wearable devices such as heart rate monitors, step counters, and other devices with the status. Other smart devices that have onboard and/or attachable sensors such as mobile devices can also be integrated. In one or more embodiments, implantable sensors and other devices can also be used to gather and transmit status information and contextual information. If the disaster event management system 402 does not receive a status update from UE 408, but does receive an indication that UE 408 and/or person associated with UE 408 has a heartbeat and/or is moving, then the disaster event management system 402 can automatically update the status of the employee based on the received data. The disaster event management system 402 can mark the status as temporary or interim until a formal status update is received from UE 408. If the authorities are trying to rescue the employee associated with UE 408, the health information and other information can be passed to the first responders system 414 to give the authorities some context regarding the wellbeing of the person associated with UE 408.

The disaster event management system 402 can also integrate data from sensors and other device in area 404 and provide that information to the first responders system 414. Sensors can include smoke detectors, fire alarms, thermostats, and etc. The sensor information can be utilized by the first responders system to facilitate route planning and other response procedures.

Figure 5:
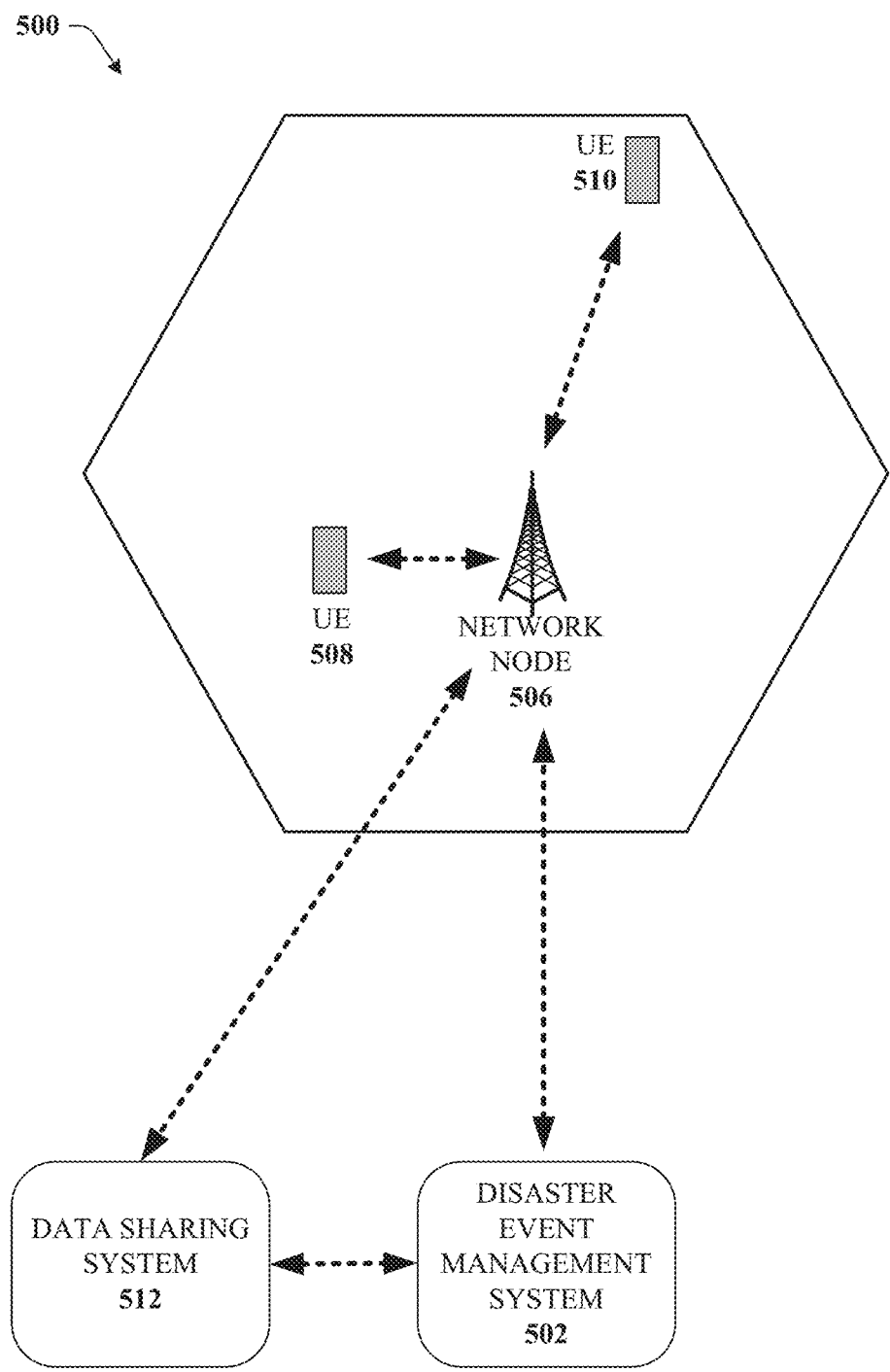
FIG. 5 illustrates another example disaster event management system and cell site or worksite in accordance with various aspects and embodiments of the subject disclosure.

Turning now to FIG. 5, illustrated is an embodiment 500 of another example disaster event management system and cell site or worksite in accordance with various aspects and embodiments of the subject disclosure.

In the embodiment shown in disaster event management system 502, disaster event management system 502 can facilitate sharing data between UE 508 and 510, as well as other sources via data sharing system 512.

The disaster event management system 502 can provide a platform for informal and validated information sharing with all users in the company and/or between and within specific groups of the company, e.g., business groups, etc. For instance, UE 508, can send image data or other contextual data about an emergency situation to disaster event management system 502 via network node 506. The disaster event management system 502 can make the information shareable via data sharing system 512, and UE 510 can access the images and other contextual data directly from data sharing system 512 via the network node 506 or other access network. As an example, the data sharing system 512 can facilitate crowdsourcing data that can be compiled for all disaster event management system users, regardless of which employer, then be displayed to users with an indicator of how many people reported similar findings or validated. The reliability of the information can be rated by other users, so that over time, more reliable information can be determined to be more trustworthy while information determined to be not trustworthy will not be propagated. In an embodiment, the reliability of the information can be based on whether a message is marked as "official" or not or based on the sender of the message. Such data can be used for data mining, statistics, and analytics that can provide insights based on word frequency, location, job role of person inputting information, etc. For example, if lots of people are talking about needing blankets or bottled water, then emergency management team can know to provide such resources in a given area. Data (including chats, timelines, requests, pictures, and etc., cna be offloaded for post event analysis and/or summarized data can be maintained until after the emergency operation is completed.

In an embodiment, the data sharing system 512 can also enable a private or semiprivate chatroom access or communications channels between UEs 508 and 510. In another embodiment, the data sharing system 512 can also enable UEs belonging to different companies to communicate with each other and share status updates. In this way, contextual information about an emergency situation can be shared among employees and employer systems for different companies that may be affected by an emergency event. For instance, different companies that share an office building can share information in response to the office building being evacuated during a fire or other emergency.

At least benefit of the person to person sharing of data is that companies can automate metrics collection, see what are key needs, and matching/searches for help do not rely on one's one personal network of contacts, clutter email, or result in each group having to create their own means of helping each other out. Knowing a person also works for the same company can add a degree of safety in that they are more of a known entity than a total stranger. Employees knowing they have a place to house their pets may also be more likely to head evacuation warnings The data sharing system 512 can also enable direct person to person assistance of goods and services to fellow employees. This can supplement donations to relief agencies and can be healing as it is more personal than a donation to a relief agency . . . . Can give more of a sense of "I personally helped and was able to take charge over something in my life during a time of crisis. The disaster event management system 502 can also enables efficient tracking and searches to match what is being offered and people wanting what is being offered. Individuals can offer to donate even before they know what employee would need the donation and potentially before the employee realizes their need. As an example, employees in a first region could begin identifying donations in anticipation of person from a second region being evacuated due to a hurricane. The persons being evacuated do not need to just rely on their network of contacts, but can leverage everyone in the company donating locally or even mailing if they are going to be out of their home area for a while due to disaster. This could have also helped in wild fires to match people with animals, especially large animals like horses, with others who could help board the animals.

Figure 6:
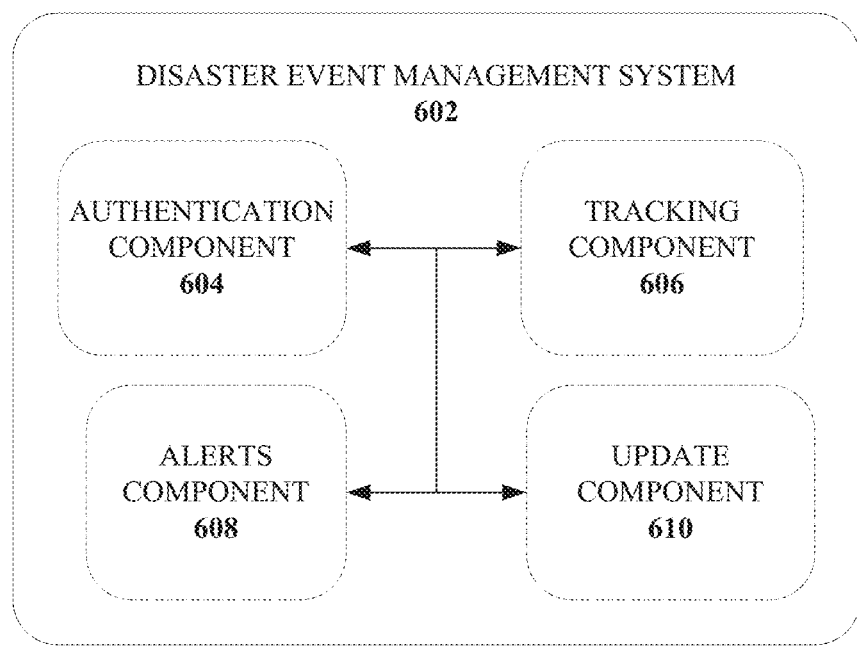
FIG. 6 illustrates an example disaster event management system in accordance with various aspects and embodiments of the subject disclosure.

Turning now to FIG. 6, illustrated is an embodiment 600 of a disaster event management system 602. Disaster event management system 602 can include an alerts component 608 that determines when an emergency situation has occurred. The alerts component 608 can determine that an emergency situation has occurred based on active advisories received from the National Weather Service, or based on alerts from government emergency management agencies (state authorities, police, fire, FEMA, and etc). The alerts component 608 can also determine that an emergency has occurred based on social media feedback. If there is a lot of activity on social media accounts that have keywords matching one or more tracked keywords ("tornado", "fire", "terrorist", "shooting", "earthquake", and etc) along with a location matching an office site or route, or other location that may affect one or more employees, the alerts component 608 can send a status update request to the mobile devices of users that may be affected.

The tracking component 606 can track the location of mobile devices and other devices associated with the employees to determine whether the employees may be affected. The tracking component 606 can use location data received from a mobile network or mobile device, access management data (e.g., card swipes at buildings), calendar data (planned meetings at specified locations), and directory information (e.g., to which office an employee is assigned).

Authentication component 604 can verify the identification code received from the mobile device with employee directory information in an employee directory database to determine whether or not the information is valid. If the ID matches, the update component 610 can mark the employee as safe. If the ID does not match, or is not present the authentication component 604 can transmit a revalidation request to the mobile device.

In an embodiment, the update component 610 can also map customer data (HR, LDAP, etc. . . . ) to a standardized database that can be used for reporting. The update component 610 can stream status update responses received back to the end customer who would then be responsible for correlation and reporting.

Figure 7:
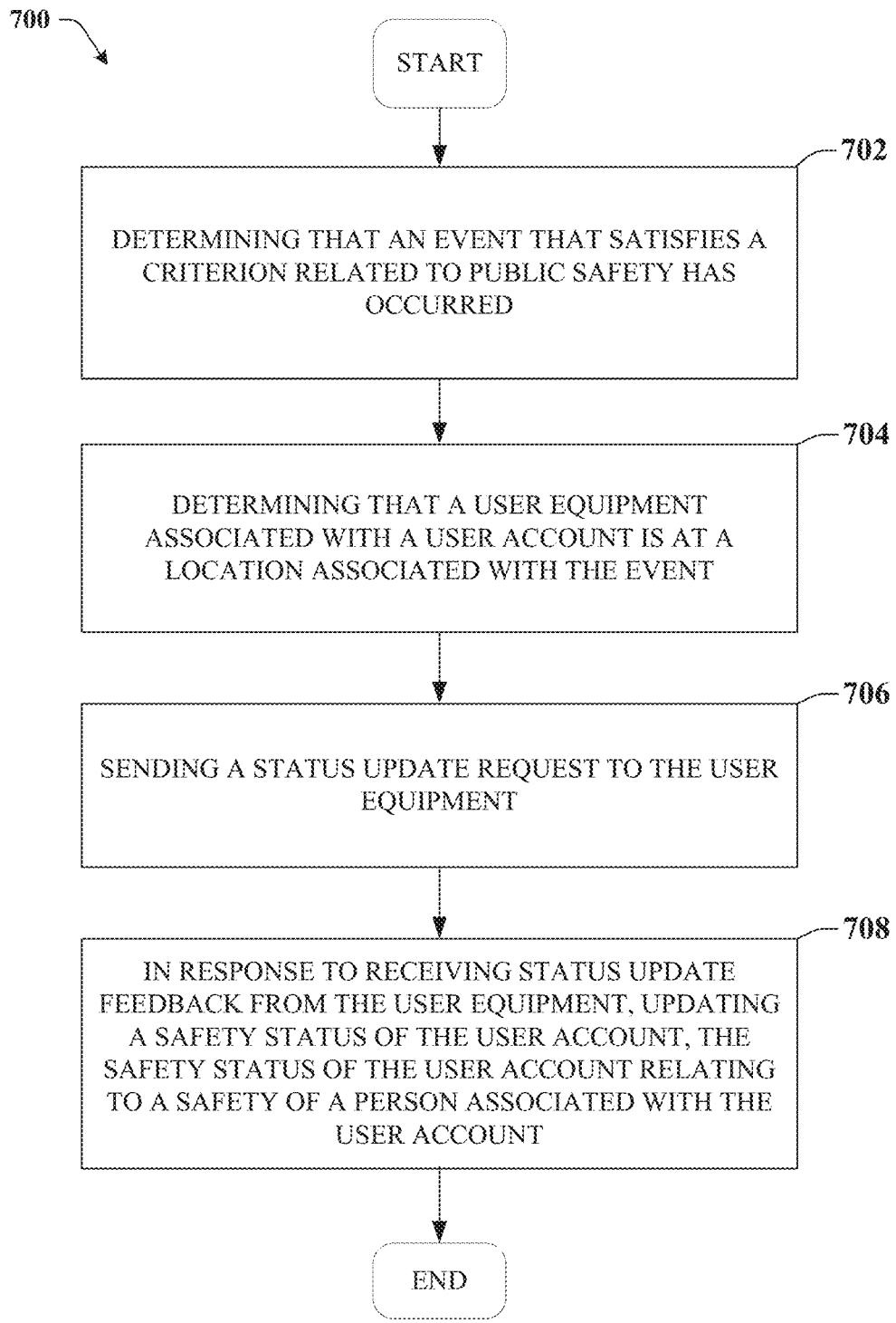
FIG. 7 illustrates an example method for tracking employees during an emergency event in accordance with various aspects and embodiments of the subject disclosure.
Figure 8:
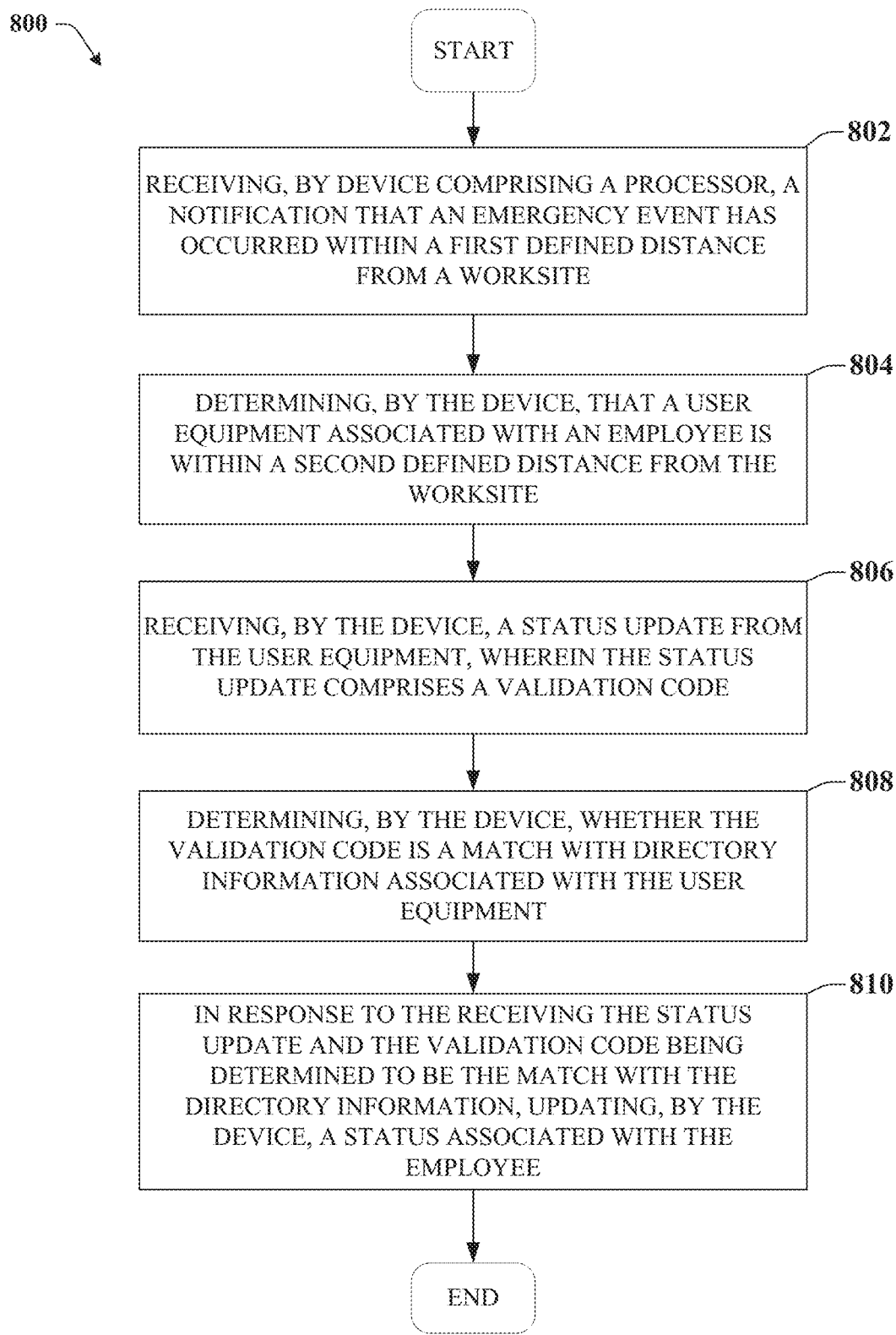
FIG. 8 illustrates an example method for tracking employees during an emergency event in accordance with various aspects and embodiments of the subject disclosure.

FIGS. 7-8 illustrates processes in connection with the aforementioned systems. The process in FIGS. 7-8 can be implemented for example by the systems in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates an example method 700 for tracking employees during an emergency event in accordance with various aspects and embodiments of the subject disclosure.

Method 700 can begin at 702 wherein the method includes determining that an event that satisfies a criterion related to public safety has occurred.

At 704, the method can include determining that a user equipment associated with a user account is at a location associated with the event.

At 706, the method can include sending a status update request to the user equipment.

At 708, the method can include, in response to receiving status update feedback from the user equipment, updating a safety status of the user account, the safety status of the user account relating to a safety of a person associated with the user account.

FIG. 8 illustrates an example method 800 for tracking employees during an emergency event in accordance with various aspects and embodiments of the subject disclosure.

Method 800 can begin at 802 wherein the method includes receiving, by device comprising a processor, a notification that an emergency event has occurred within a first defined distance from a worksite.

At 804, the method can include determining, by the device, that a user equipment associated with an employee is within a second defined distance from the worksite.

At 806, the method can include receiving, by the device, a status update from the user equipment, wherein the status update comprises a validation code.

At 808, the method includes determining, by the device, whether the validation code is a match with directory information associated with the user equipment.

At 810, the method can include in response to the receiving the status update and the validation code being determined to be the match with the directory information, updating, by the device, a status associated with the employee.

Figure 9:
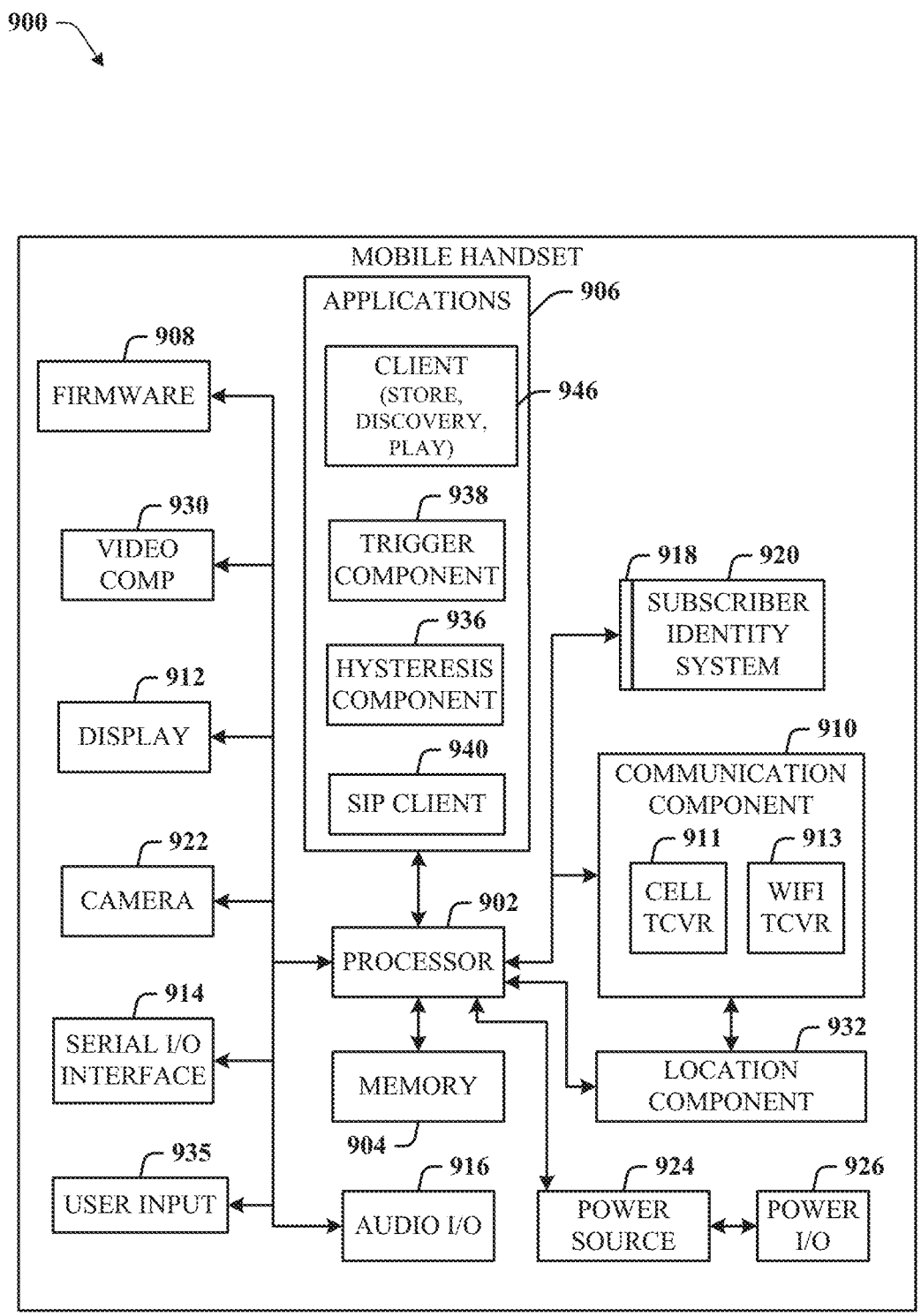
FIG. 9 illustrates an example block diagram of an example user equipment that can be a mobile handset operable to provide a format indicator in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
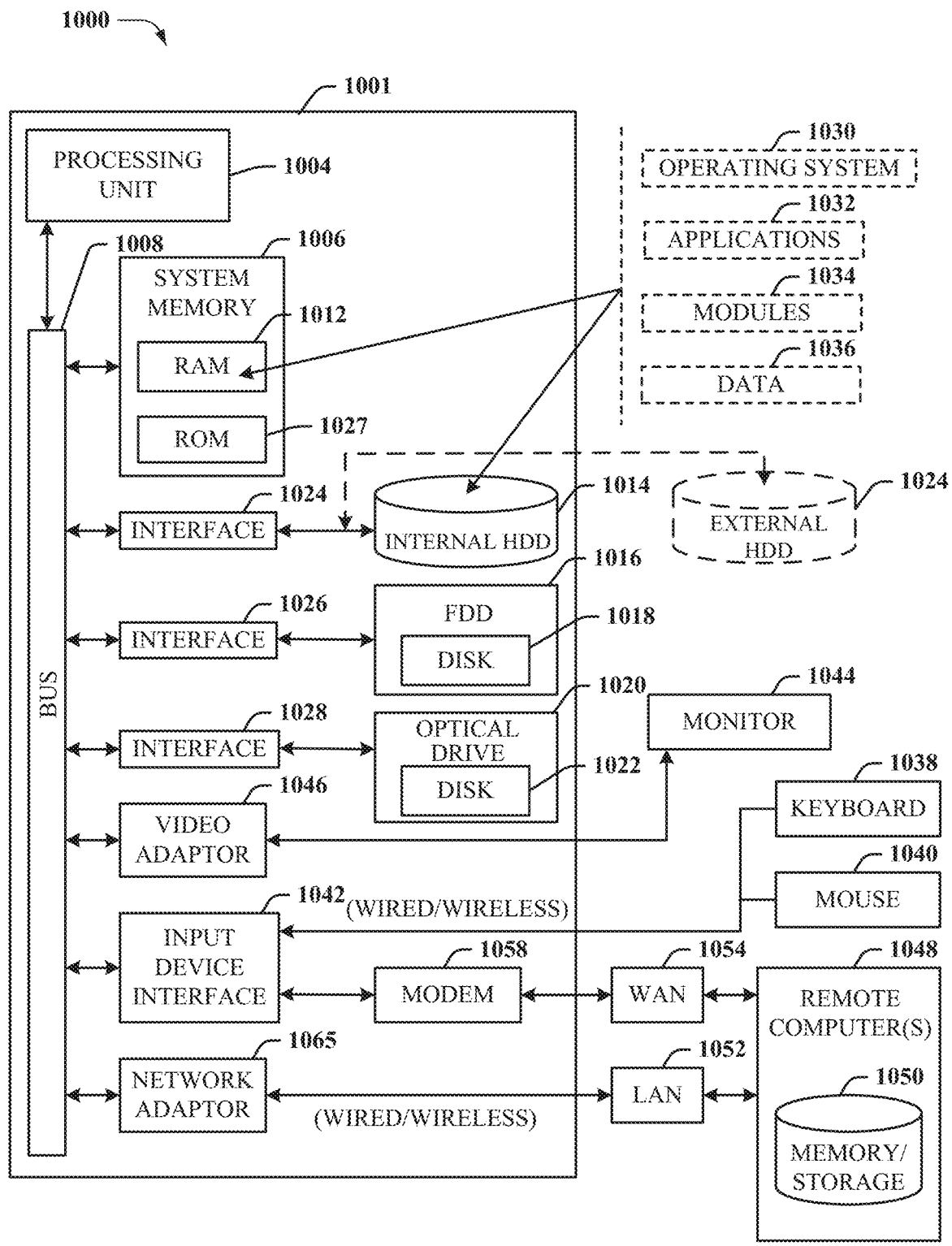
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 406) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
   a processor; and
   a memory that stores executable instructions that, when executed by the processor, facilitate performance of operations, comprising:
   determining that an event that satisfies a criterion related to an alert has occurred;
   determining that a first user equipment associated with a first user account is at a first location associated with the event;
   sending a status update request to the first user equipment;
   in response to receiving first status update feedback from the first user equipment, updating a status of the first user account, the status of the first user account relating to a personal identity associated with the first user account;
   in response to the determining that the first user equipment associated with the first user account is at the first location, determining that second status update feedback was not received from a second user equipment device associated with a second location of the event;
   in response to the determining that the second status update feedback was not received from the second user equipment device, transmitting the second location of the second user equipment device to a monitoring device; and
   based on the second location and a job hierarchy associated with a second user of the second user equipment device, generating response data representative of a response protocol for an emergency responder to implement.

2. The system of claim 1, wherein the operations further comprise:
   in response to the sending the status update request to the first user equipment, receiving an identification code from the first user equipment.

3. The system of claim 2, wherein the operations further comprise:
   in response to the receiving the identification code, matching the identification code to directory information associated with the first user account.

4. The system of claim 2, wherein the operations further comprise:
   in response to the receiving the identification code, determining that the identification code does not match directory information associated with the first user account.

5. The system of claim 4, wherein the operations further comprise:
   based on the determining that the identification code does not match the directory information, temporarily holding the updating of the status of the first user account.

6. The system of claim 5, wherein the temporarily holding the updating of the status comprises temporarily holding the updating of the status until a matching identification code is received from the first user equipment.

7. The system of claim 1, wherein the operations further comprise:
   transmitting a context update, generated based on the status, to a third user equipment associated with a third user account; and
   determining the first location of the first user equipment based on global positioning coordinate information received from the first user equipment.

8. The system of claim 1, wherein the determining that the first user equipment is at the first location associated with the event comprises:
   determining the first location of the first user equipment based on social media information associated with the first user account.

9. The system of claim 1, wherein the operations further comprise:
   receiving a context update related to the event from the first user equipment.

10. The system of claim 9, wherein the context update comprises at least one of textual data, or image data.

11. The system of claim 1, wherein the operations further comprise:
    determining the first location of the first user equipment based on keyword tracker data associated with social media information associated with the first user account.

12. The system of claim 1, wherein the operations further comprise:
    receiving a group of status updates within a defined amount of time after the event has been determined to have occurred.

13. A method, comprising:
    facilitating, by a first device comprising a processor, receiving a notification that an emergency event has occurred within a first defined distance from a worksite;
    determining, by the first device, that a first user equipment device associated with a first employee is within a second defined distance from the worksite;
    in response to receiving a first status update, updating, by the first device, a status associated with the first employee;
    determining, by the first device, that a second status update was not received from a second user equipment device associated with a second employee within the second defined distance from the worksite; and
    in response to the determining that the second status update was not received from the second user equipment device, facilitating, by the first device, transmitting a location of the second user equipment device to a second device associated with a first responder system to prompt an emergency responder to respond to the location as an increased danger location according to a protocol applicable to an increased danger associated with the increased danger location, wherein the protocol mandates that the emergency responder respond to the location based on a job hierarchy associated with the second user equipment device.

14. The method of claim 13, further comprising:
facilitating, by the first device, transmitting, to the first user equipment device, a validation request to validate the notification.

15. The method of claim 14, further comprising:
in response to a validation code being determined not to be a match with directory information, facilitating, by the first device, transmitting, to the first user equipment device, a revalidation request.

16. The method of claim 13, wherein the determining that the first user equipment device is within the second defined distance from the worksite further comprises identifying a base station device that serves the first user equipment device.

17. The method of claim 13, further comprising:
based on an analysis of a social media content, determining, by the first device, that the emergency event has occurred.

18. A non-transitory machine-readable medium, comprising executable instructions that, when executed by a processor of a first device, facilitate performance of operations, comprising:

determining that a first mobile device associated with a first employee is within a first defined distance of an emergency event based on a network location of the first mobile device;

in response to the determining that the first mobile device is associated with the first employee, receiving a first status update from the first mobile device, in response to the receiving the first status update, updating a status of the first employee in an emergency tracking data store with status information representative of the first status update;

determining that a second status update was not received from a second mobile device associated with a second employee within a second defined distance of the emergency event;

transmitting a location of the second mobile device to a second device associated with an emergency management system to indicate a higher danger associated with the emergency, in relation to the location, than danger associated with the first defined distance; and based on the location of the second mobile device and a job hierarchy associated with the second employee, transmitting response procedure data representative of a response procedure to the second device.

19. The non-transitory machine-readable medium of claim 18, wherein the second defined distance is based on a job hierarchy found within a directory data store.

20. The non-transitory machine-readable medium of claim 18, wherein the first status update comprises a validation code, and wherein the validation code is an employee identification number of the first employee.

* * * * *